(No Model.)

W. A. CARPENTER.
FLOAT FOR TRANSPORTATION CANS.

No. 352,910. Patented Nov. 23, 1886.

Witnesses
Wm. A. Rosenbaum
F. L. Ober

Inventor
William A. Carpenter
By his Attorney
V. D. Stockbridge

UNITED STATES PATENT OFFICE.

WILLIAM A. CARPENTER, OF SUTTON, NEBRASKA.

FLOAT FOR TRANSPORTATION-CANS.

SPECIFICATION forming part of Letters Patent No. 352,910, dated November 23, 1886.

Application filed April 13, 1886. Serial No. 198,735. (No model.)

*To all whom it may concern:*

Be it known that I, WILLIAM A. CARPENTER, a citizen of the United States, residing at Sutton, in the county of Clay and State of Nebraska, have invented certain new and useful Improvements in Floats for Transportation-Cans; and I do hereby declare the following to be a full, clear, and exact description of the invention, such as will enable others skilled in the art to which it appertains to make and use the same.

My invention relates to an improved float for transportation milk or cream cans; and it consists, first, in an air-tight float or drum lined with non-conducting material, so that the joints of the float will not be strained or opened by the expansion of the confined air when scalded or washed in hot water.

It consists, also, in a drum or float having a conical, convex, or inclined top, a bottom plate flush with the lower edge of its body, and side conduits or passages for milk or cream. The purpose of this construction is to avoid re-entrant angles, passages through the float, and all surfaces to which access for scrubbing would be difficult, and at the same time to secure the usual functions of floats for milk-cans.

Figure 1:
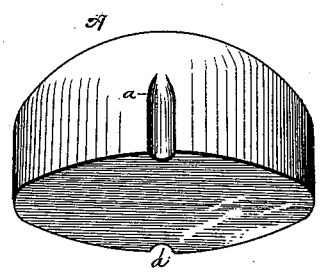
Figure 2:
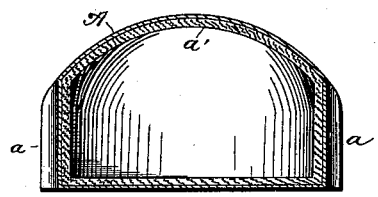

In the drawings, Figure 1 is a perspective showing the general contour of my improved float, and Fig. 2 is a section of the same.

A is a float or drum made of any suitable metal tinned or plated, as may be desired. The float has a bottom plate flush with its lower edge, is arched at the top, as shown, and is provided with one or more side passages, $a\ a$, for the passage of cream or milk past the float.

The float is lined with paper, asbestus fabric, or other suitable non-conducting material, for the purpose of preventing expansion of the confined air, and thus to avoid bursting or straining of the same when scalded for cleansing purposes.

$a'$ is the non-conducting lining, which may be attached to the walls of the drum by means of cement, or may be sustained by a frame within, as preferred.

The form of the float is such that there are no angles or inaccessible surfaces to become stale from imperfect washing, to which other forms of float are incident.

The float is intended to fit nicely within the can, and be of such specific gravity as a whole as to ride on the surface of the cream and prevent churning.

Having fully described my invention, what I claim as new is—

1. An air-tight float for transportation-cans provided with an internal lining of non-conducting material, substantially as described.

2. A drum-float for transportation-cans having an arched top, its bottom plate flush with its lower edge, and external grooves or passages, substantially as described.

3. An air-tight float for transportation-cans having arched tops, external grooves or passages, and non-conducting lining, substantially as described.

In testimony whereof I affix my signature in presence of two witnesses.

WILLIAM A. CARPENTER.

Witnesses:
W. F. STONE,
C. F. MEYER.